US010532787B2

(12) United States Patent
Park (10) Patent No.: US 10,532,787 B2
(45) Date of Patent: Jan. 14, 2020

(54) COMPACT MOBILE DEVICE HAVING ADJUSTABLE DRIVE MODE

(71) Applicants: Hyundai Motor Company, Seoul (KR); Kia Motors Corporation, Seoul (KR)

(72) Inventor: Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 75 days.

(21) Appl. No.: 15/804,117

(22) Filed: Nov. 6, 2017

(65) Prior Publication Data

US 2018/0354576 A1 Dec. 13, 2018

(30) Foreign Application Priority Data

Jun. 9, 2017 (KR) .................. 10-2017-0072658

(51) Int. Cl.
| | | |
|---|---|---|
| *B62K 13/04* | (2006.01) | |
| *B62J 25/00* | (2006.01) | |
| *B62K 15/00* | (2006.01) | |
| *B62K 11/00* | (2006.01) | |
| *B62K 11/14* | (2006.01) | |

(52) U.S. Cl.
CPC ............ *B62K 13/04* (2013.01); *B62K 11/007* (2016.11); *B62K 11/14* (2013.01); *B62K 15/008* (2013.01); *B62J 25/00* (2013.01); *B62K 2015/005* (2013.01); *B62K 2202/00* (2013.01)

(58) Field of Classification Search
CPC ........ B62K 13/04; B62K 13/00; B62K 13/08; B62K 21/125; B62K 21/12; B62K 11/007; B62K 11/14; B62K 2202/00; B62K 15/006; B62K 15/008; B62K 15/00; B62K 5/027; B62K 2015/005; B62J 25/00
USPC ........................................ 180/209, 208, 6.62
See application file for complete search history.

(56) References Cited

U.S. PATENT DOCUMENTS

| | | | |
|---|---|---|---|
| D551,722 S | 9/2007 | Chang et al. | |
| 2009/0288685 A1* | 11/2009 | Wolfe ................... | A47L 7/0009 134/21 |
| 2009/0308676 A1* | 12/2009 | Wang ..................... | B62K 5/007 180/208 |

(Continued)

FOREIGN PATENT DOCUMENTS

| | | |
|---|---|---|
| JP | 5675400 B2 | 2/2015 |
| KR | 101319481 B1 | 10/2013 |

(Continued)

*Primary Examiner* — Keith J Frisby
(74) *Attorney, Agent, or Firm* — Slater Matsil, LLP (57) ABSTRACT

A compact mobility device has an adjustable drive mode. The device includes a base panel and a number of drive wheels rotatably provided at opposite ends of the base panel. The drive wheels are configured to rotate by receiving torque from a driving unit. A column is constituted by a plurality of links connected in series to be foldable and is configured such that a lower end of a lower link is rotatably coupled to the base panel with an upper end of an upper link being provided with a steering handle. An auxiliary wheel is provided between the links constituting the column and is configured to roll along with the drive wheels by coming into contact with a ground when the links are folded.

20 Claims, 7 Drawing Sheets

(56) References Cited

U.S. PATENT DOCUMENTS

| | | | | |
|---|---|---|---|---|
| 2010/0187034 | A1* | 7/2010 | Wang | B62K 5/007 |
| | | | | 180/208 |
| 2011/0247889 | A1* | 10/2011 | Kosco | B62K 5/025 |
| | | | | 180/208 |
| 2013/0033020 | A1* | 2/2013 | Arjomand | A45F 4/02 |
| | | | | 280/287 |
| 2015/0021877 | A1 | 1/2015 | Kim | |
| 2015/0209205 | A1* | 7/2015 | Ransenberg | B62K 15/008 |
| | | | | 280/641 |
| 2016/0297459 | A1* | 10/2016 | Opsvik | B62K 3/002 |
| 2018/0043958 | A1* | 2/2018 | Kama | B62K 5/025 |
| 2019/0009854 | A1* | 1/2019 | Bao | B62K 3/00 |

FOREIGN PATENT DOCUMENTS

| | | | | |
|---|---|---|---|---|
| KR | 101572635 | B1 | 11/2015 | |
| WO | WO-2010076397 | A1 * | 7/2010 | A45C 5/14 |

\* cited by examiner

COMPACT MOBILE DEVICE HAVING ADJUSTABLE DRIVE MODE

CROSS-REFERENCE TO RELATED APPLICATIONS

This application claims priority to Korean Patent Application No. 10-2017-0072658, filed on Jun. 9, 2017, which application is hereby incorporated herein by reference.

TECHNICAL FIELD

The present invention relates generally to a compact mobility device having an adjustable drive mode.

BACKGROUND

Recently, personal mobility devices having two wheels as personal transport devices have appeared. The mobility device is advantageous in that since the turning radius is close to 0 due to the two wheels and even it can rotate in place, it can move freely in a confined space.

However, a two-wheeled mobility device stabilizes its physically unstable structure through controlling, and there is a risk of injury if control failure or malfunction occurs. Further, in the driving mode with two wheels, the center of gravity is located at a high position and the stability is low. Therefore, two-wheel system is not suitable for high-speed driving.

On the other hand, a three-wheeled mobility device has a physically stable structure and the center of gravity is located at a low position, whereby it is advantageous in terms of driving stability. However, if the mobility device having three wheels performs cornering, there is a problem that the turning radius is large.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and embodiments of the present invention propose a compact mobility device, which is capable of changing a driving mode between two-wheel driving mode and three-wheel driving mode by using a plurality of drive wheels and an auxiliary wheel disposed in a foldable column.

As such, the present invention relates generally to a compact mobility device having an adjustable drive mode. In particular embodiments, the present invention relates to a compact mobility device, which is capable of changing a driving mode between two-wheel mode and three-wheel mode by an auxiliary wheel coming into contact with the ground when a column constituted by a plurality of foldable links is folded.

In order to achieve the above object, according to one aspect of the present invention, a compact mobility device has an adjustable drive mode. The device includes a base panel and a plurality of drive wheels rotatably provided at opposite ends of the base panel. The drive wheels are configured to rotate by receiving torque from a driving unit. A column is constituted by a plurality of links connected in series to be foldable and is configured such that a lower end of a lower link is rotatably coupled to the base panel, and an upper end of an upper link is provided with a steering handle. In auxiliary wheel is provided between the plurality of links constituting the column and is configured to roll along with the drive wheels by coming into contact with a ground when the plurality of links is folded.

The column may be configured to be bent forward from a lower to an upper end thereof in an unfolded state.

The steering handle may be provided with a speed controller receiving a desired speed of the drive wheels from an operator.

The base panel may be provided with a back plate, wherein the back plate is configured to be rotated based on the base panel, so as to constitute a footrest by being accommodated in the base panel, or so as to constitute a backrest by being opened from the base panel.

A foot plate may be provided at a location, where the auxiliary wheel is provided, of the upper link or the lower link, wherein the foot plate is configured to be rotated based on the link to be accommodated in or opened from the link, thereby realizing a footrest.

The compact mobility device may be configured to go straight when the plurality of drive wheels is at a same speed, and to corner when a speed difference occurs between the plurality of drive wheels.

According to an embodiment, the auxiliary wheel may be an omni-directional wheel constituted by a plurality of rotating wheels relatively rotatable with each other, an installation direction of the auxiliary wheel may be fixed in a straight direction, and steering may be achieved by each of the rotating wheels having a relative wheel speed when cornering by the speed difference between the plurality of drive wheels.

The steering handle may be rotatably coupled to the upper link, and an encoder may be provided between the steering handle and the upper link to measure a steering angle of the steering handle based on the upper link.

According to another embodiment, the compact mobility device may further include a connector being in a shape that surrounds an outer circumferential surface of the upper link, and being rotatably coupled to the upper link, wherein the auxiliary wheel and the upper link are rotated together as the steering handle is rotated, and an outer circumferential surface of the connector is coupled to the lower link.

A plurality of bars may be rotatably provided between the connector and the lower link, such that the upper link and the lower link are folded or unfolded.

The connector and the lower link may be coupled to each other in a four-bar link structure.

The compact mobility device may further include an encoder provided between the upper link and the connector, wherein the encoder measures a rotation angle between the upper link and the connector.

According to a further embodiment, the lower link may be rollably coupled to the base panel, and the lower link, the upper link, and the auxiliary wheel may be rolled together as the steering handle is rolled.

The compact mobility device may further include an encoder provided between the lower link and the base panel, wherein the encoder measures a rolling angle between the lower link and the base panel.

According to the compact mobility device of the present invention, it is advantageous in that in a cramped indoor space, the column is unfolded and driven by two drive wheels to reduce the turning radius, thereby realizing free movement, and in order to drive at a high speed, the column is folded, such that the auxiliary wheel comes into contact with the ground, thereby realizing stable driving by using three wheels.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present invention will be described in detail with reference to the accompanying drawings.

Figure 1:
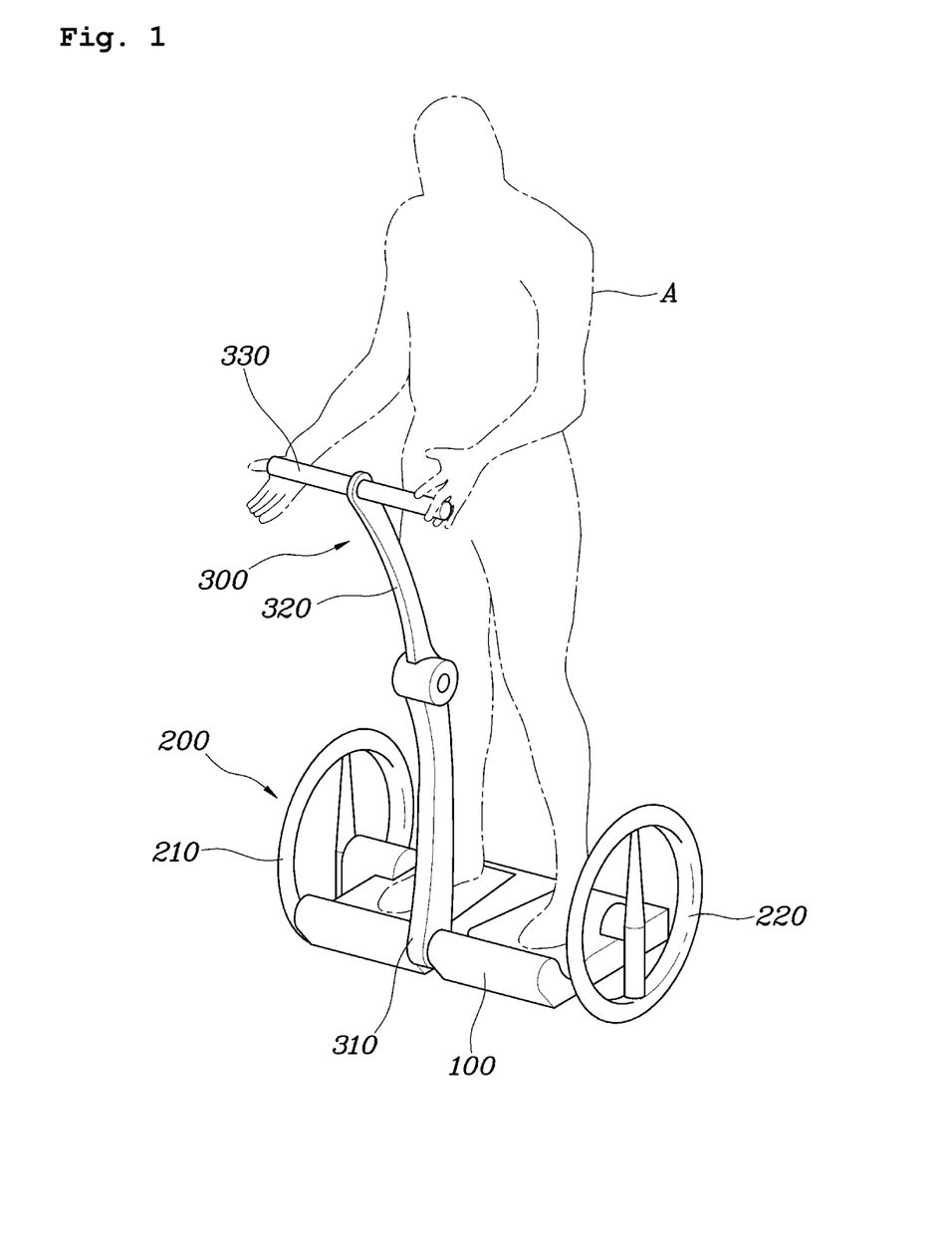
FIG. 1 is a perspective view showing a two-wheel mode of a compact mobility device according to an embodiment of the present invention.
Figure 2:
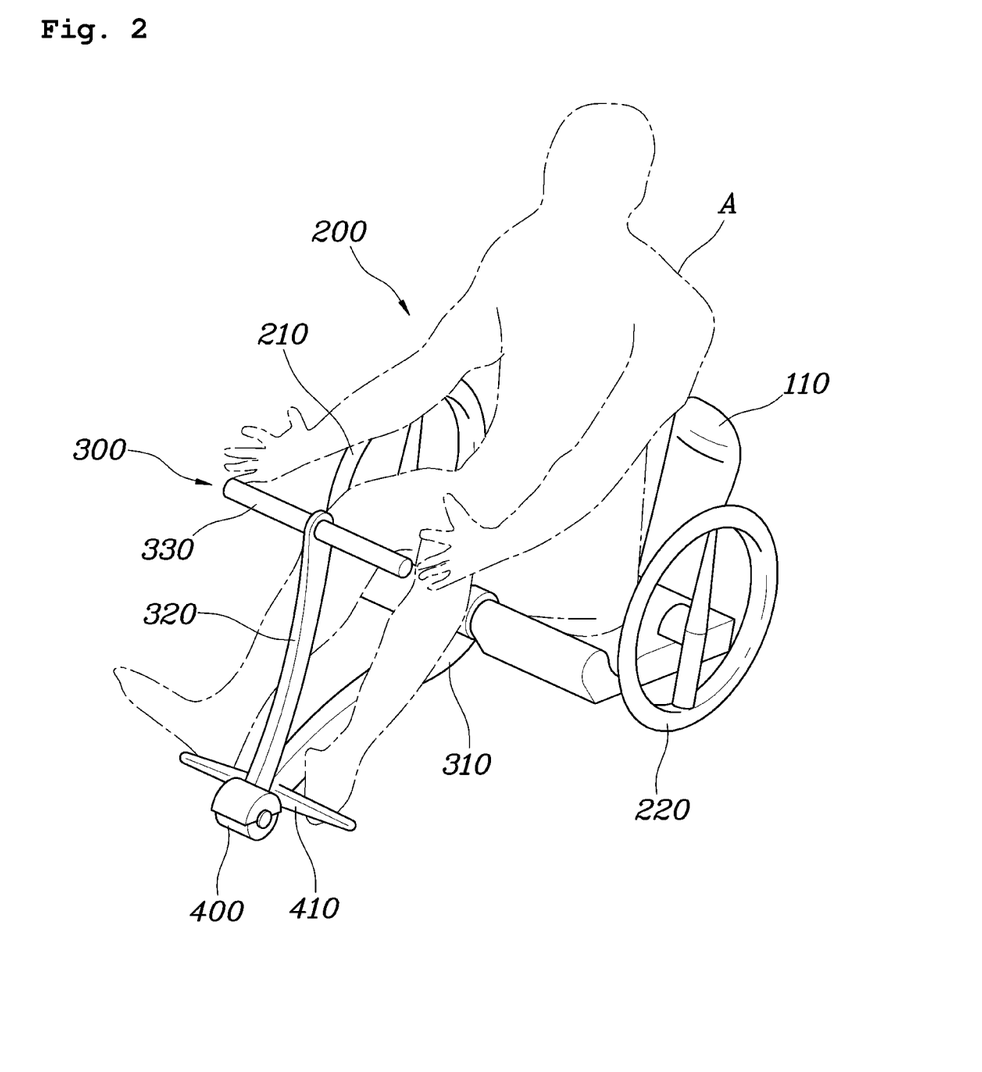
FIG. 2 is a perspective view showing a three-wheel mode of the compact mobility device according to an embodiment of the present invention.

FIG. 1 is a perspective view showing a two-wheel mode of a compact mobility device according to an embodiment of the present invention; and FIG. 2 is a perspective view showing a three-wheel mode of the compact mobility device according to an embodiment of the present invention.

Referring to FIGS. 1 to 2, the compact mobility device according to an embodiment of the present invention includes: a base panel 100; a plurality of drive wheels 200 rotatably provided at opposite ends of the base panel 100, and configured to rotate by receiving torque from a driving unit (not shown); a column 300 constituted by a plurality of links 310 and 320 connected in series to be foldable, and configured such that a lower end of a lower link 310 is rotatably coupled to the base panel 100, and an upper end of an upper link 310 is provided with a steering handle 330; and an auxiliary wheel 400 provided between the plurality of links 310 and 320 constituting the column 300, and configured to roll along with the drive wheels by coming into contact with a ground when the plurality of links 310 and 320 is folded.

The base panel 100 is a part for supporting an operator A, and as shown in FIG. 1, in the two-wheel mode, the operator A can board on the base panel 100 in a state of standing. Here, the base panel 100 can be used as a footrest for the operator A. As shown in FIG. 2, in the three-wheel mode, the operator A can board on the base panel 100 in a state of sitting. Here, the base panel 100 can be used as a saddle for the operator A.

The plurality of drive wheels 200 is rotatably provided at the opposite ends of the base panel 100. For example, the plurality of drive wheels 200 may be provided at right and left ends of the base panel 100, respectively, such that a right drive wheel 210 and a left drive wheel 220 are provided based on the operator A.

The plurality of drive wheels 200 is rotated by receiving torque from the driving unit (not shown) to move the base panel 100, on which the operator A is board. The driving unit (not shown) may be provided to the plurality of drive wheels 200, respectively, or may be provided in single to individually drive the plurality of drive wheels 200.

The column 300 is constituted by the plurality of links 310 and 320 connected in series to be foldable. The lower end of the lower link 310 may be rotatably coupled to the base panel 100, an upper end of the lower link 310 may be connected with a lower end of the upper link 320, and the upper end of the upper link 320 may be provided with the steering handle 330.

The auxiliary wheel 400 may be provided between the plurality of links 310 and 320 constituting the column 300. As in the embodiment, the auxiliary wheel 400 may be provided at a junction between the upper portion of the lower link 310 and the lower portion of the upper link 320.

The present invention may be configured such that in the two-wheel mode of FIG. 1, the plurality of links 310 and 320 are unfolded, and the auxiliary wheel 400 does not come into contact with the ground. However, in the three-wheel mode of FIG. 2, the plurality of links 310 and 320 are folded, and the auxiliary wheel 400 comes into contact with the ground, thereby rolling along with the plurality of drive wheels 200. The two-wheel mode and the three-wheel mode are determined depending on whether the auxiliary wheel 400 comes into contact with the ground. In the two-wheel mode, the auxiliary wheel 400 may be hidden between the plurality of links 310 and 320 so as not to be exposed.

The column 300 may be configured to be bent forward from a lower to an upper end thereof in an unfolded state as shown in FIG. 1. Herein, all the plurality of links 310 and 320 constituting the column 300 may be bent forward, or one of the upper link 320 and the lower link 310 may be bent forward. This allows the appropriate distance between the operator A and the steering handle 330 to be maintained and prevents the lower link 310 from coming into contact with the ground when the column 300 is folded as shown in FIG. 2.

The steering handle 330 may be provided with a speed controller (not shown) receiving a desired speed of the drive wheels 200 from an operator A. The operator A can input the desired speed through the speed controller (not shown) provided on the steering handle 330, while holding the steering handle 330.

The compact mobility device may be configured to go straight when the plurality of drive wheels 200 is at a same speed, and to corner when a speed difference occurs between the plurality of drive wheels 200. To be more specific, the plurality of drive wheels 200 may be constituted by the right drive wheel 210 and the left drive wheel 220 based on the operator A, wherein when the right drive wheel 210 is faster than the left drive wheel 220, the compact mobility device may perform cornering to the left, and on the contrary, when the left drive wheel 220 is faster than the right drive wheel 210, the compact mobility device the compact mobility device may perform cornering to the right.

A foot plate 410 may be provided at a location, where the auxiliary wheel 400 is provided, of the upper link 320 or the lower link 310. As in the embodiment, the foot plate 410 may be provided on the lower link 310 at a location near the auxiliary wheel 400. The foot plate 410 is rotatably provided based on the link, so as to realize a footrest by being opened from the link in the three-wheel mode. In the embodiment, the foot plate 410 is rotatably provided on the lower link 310 to be accommodated in or opened from the lower link 310. The foot plate 410 may be provided on the upper link 320.

Further, the base panel 100 may be provided with a back plate no. The back plate no is rotated based on the base panel 100 to be accommodated in or opened from the base panel 100. The back plate 110 may constitute the footrest by being accommodated in the base panel 100 in the two-wheel mode, or may constitute the backrest by being opened from the base panel 100 in the three-wheel mode.

Figure 3:
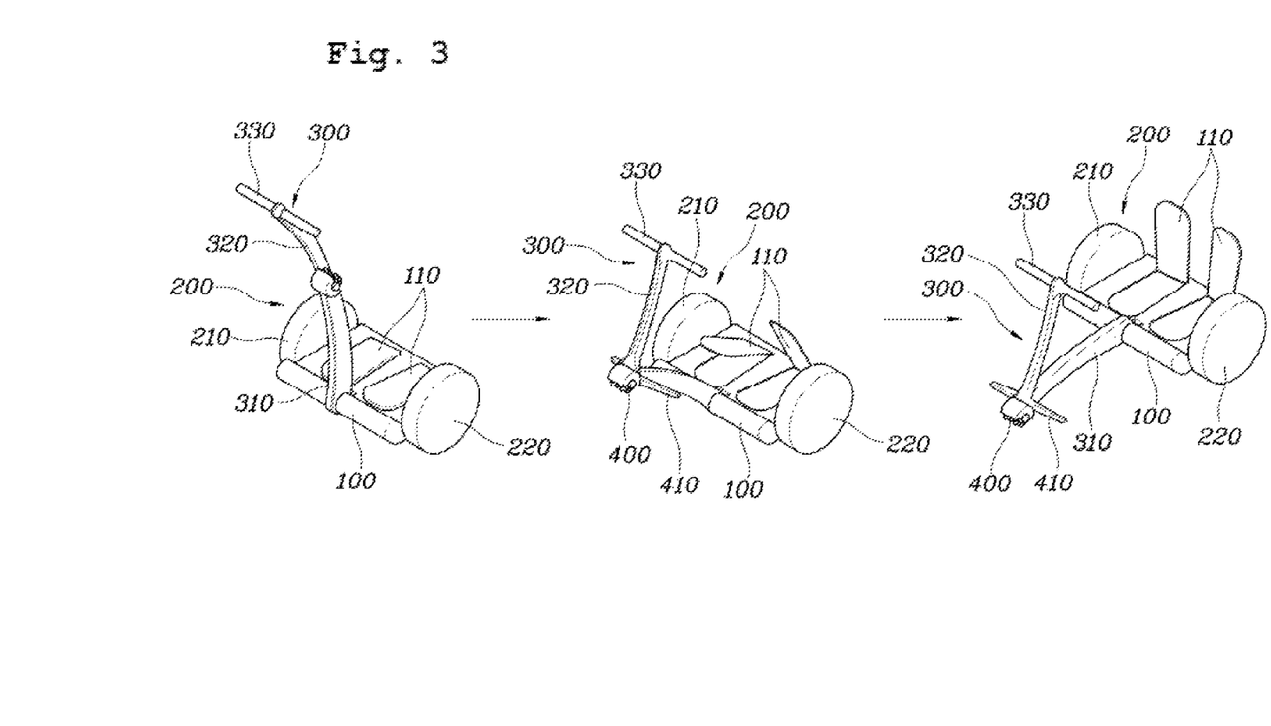
FIG. 3 is a flowchart showing a process of changing from the two-wheel mode to the three-wheel mode of the compact mobility device according to an embodiment of the present invention.

FIG. 3 is a flowchart showing a process of changing from the two-wheel mode to the three-wheel mode of the compact mobility device according to an embodiment of the present invention.

Referring to FIG. 3, when the driving mode is changed from the two-wheel mode to the three-wheel mode, the links of the column 300 that is constituted by the plurality of links 310 and 320 are folded, and the auxiliary wheel 400 is exposed and comes into contact with the ground. To be more specific, the lower portion of the lower link 310 is rotated based on the base panel 100, and the upper link 320 is rotated based on the lower link 310.

Further, the back plate 110 that constitutes the footrest in the two-wheel mode may realize a backrest in the three-wheel mode by being rotated based on the base panel 100.

As in the embodiment, the foot plate 410 that is accommodated in the lower link 310 in the two-wheel mode is opened from the lower link 310 in the three-wheel mode, thereby realizing the footrest for the operator A.

Figure 4:
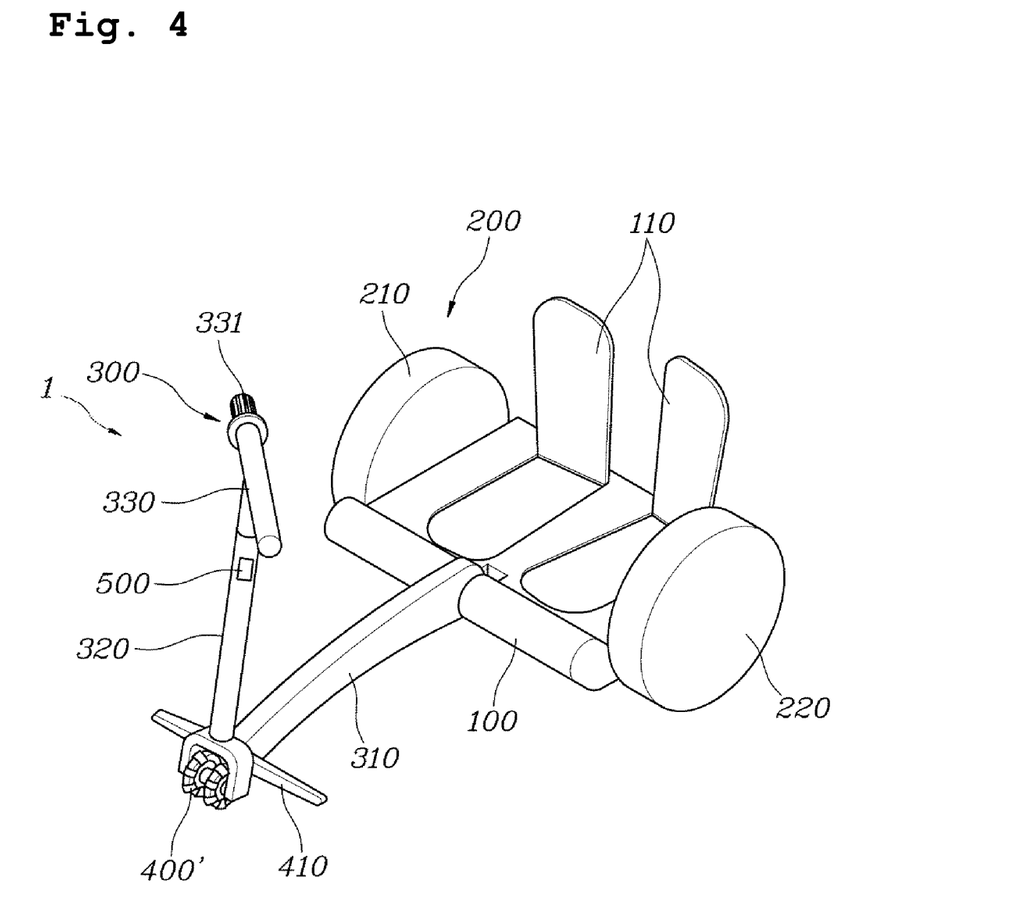
FIG. 4 is a perspective view showing the compact mobility device having steering mechanism 1 according to an embodiment of the present invention.

FIG. 4 is a perspective view showing the compact mobility device having steering mechanism 1 according to an embodiment of the present invention.

Referring to FIG. 4, an auxiliary wheel 400' of the steering mechanism 1 is constituted by an omni-directional wheel constituted by a plurality of rotating wheels relatively rotatable with each other. The omni-directional wheel is provided with a plurality of rotating wheels, wherein each of the rotating wheels is relatively rotatable with each other, thereby being capable of moving in all directions with its installation direction fixed. Accordingly, the auxiliary wheel 400' is capable of moving right and left with its installation direction fixed in a straight direction as the plurality of rotating wheels is rotated.

The steering handle 330 is rotatably coupled to the upper link 320, and the auxiliary wheel 400' is coupled to the upper link 320 through a fork, or the like, whereby the upper link 320 is not rotated when the steering handle 330 is rotated, so the auxiliary wheel 400' can be fixed in the straight direction.

In the steering mechanism 1, the compact mobility device is steered by the speed difference between the plurality of drive wheels 200, and each of the rotating wheels, which constitute the auxiliary wheel 400', has a relative wheel speed when cornering, whereby it is possible to perform cornering right and left with being fixed in the straight direction.

The steering handle 330 is provided with a speed controller 331 that receives a desired speed of the plurality of drive wheels 200 from the operator. The steering handle 330 is rotatably coupled to the upper link 320, and an encoder 500 may be provided between the steering handle 330 and the upper link. The encoder 500 can measure a steering angle of the steering handle 330 based on the upper link 320. The steering angle between the upper link 320 and the steering handle 330 measured by the encoder 500 can be the basis for controlling the speed difference between the plurality of drive wheels 200.

Figure 5:
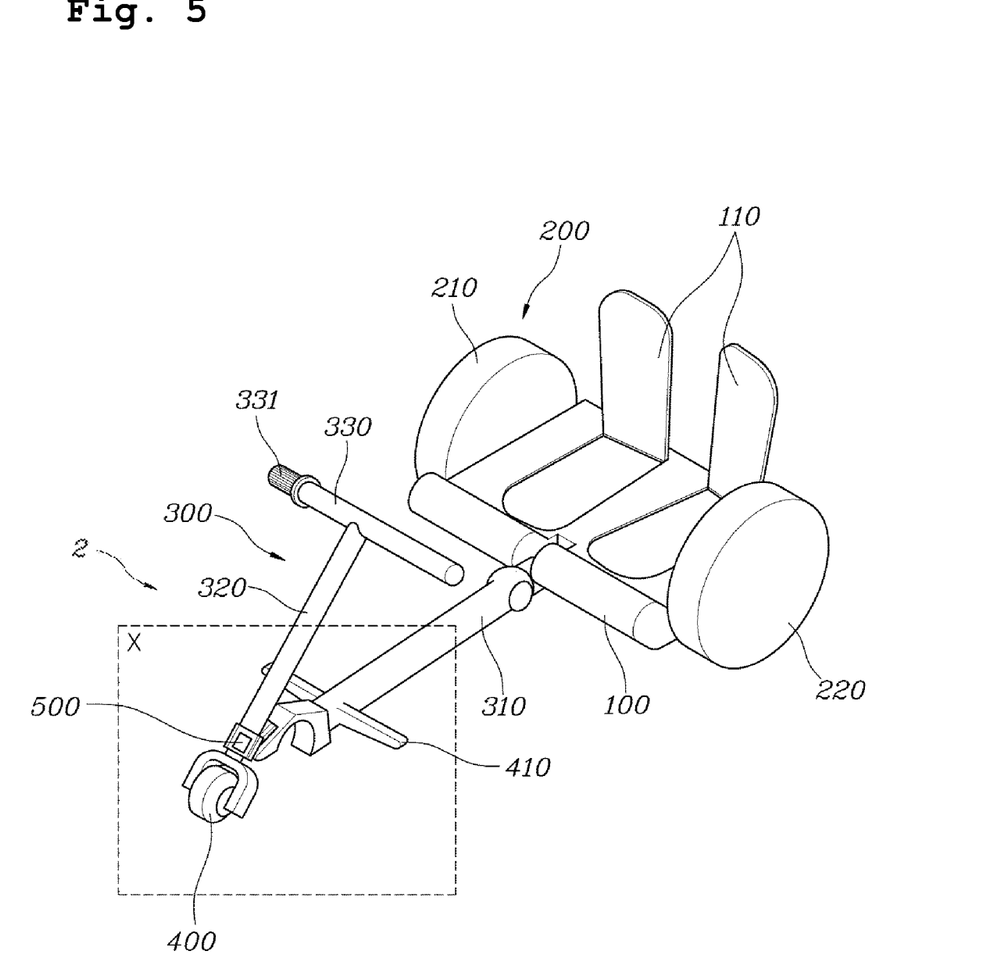
FIG. 5 is a perspective view showing the compact mobility device having steering mechanism 2 according to an embodiment of the present invention.
Figure 6:
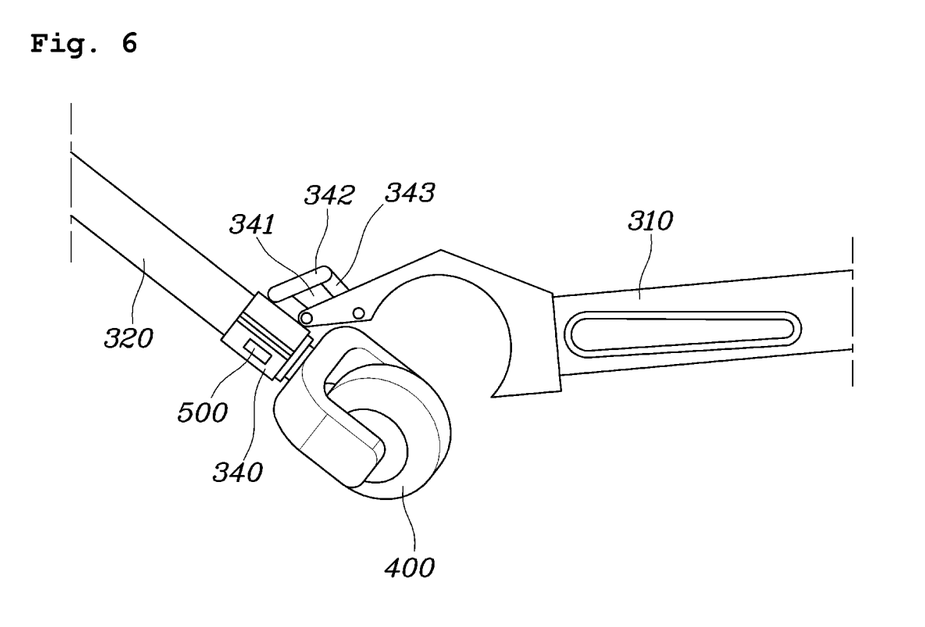
FIG. 6 is an enlarged view of area X of FIG. 5.

FIG. 5 is a perspective view showing the compact mobility device having steering mechanism 2 according to an embodiment of the present invention; and FIG. 6 is an enlarged view of area X of FIG. 5.

Referring to FIG. 5, the auxiliary wheel 400 of the steering mechanism 2 is generally constituted by one rotating wheel, and the rotating wheel is rotatably coupled to the link. The auxiliary wheel 400 may be coupled to the upper link 320 through a fork, or the like.

The steering handle 330 may be integrally coupled to the upper link 320, such that it is rotated along with the upper link 320 as the steering handle 330 is rotated, and the auxiliary wheel 400 is rotated as the upper link 320 is rotated. The steering handle 330 is provided with the speed controller 331 that receives a desired speed of the plurality of drive wheels 200 from the operator.

The compact mobility device may further include a connector 340 being in a shape that surrounds an outer circumferential surface of the upper link 320, and being rotatably coupled to the upper link 320. The connector 340 can be coupled to the lower link 310 through the outer circumferential surface of the lower link.

To be more specific, further referring to FIG. 6, the connector 340 rotatably coupled to the upper link 320 while surrounding the same may be coupled with the lower link 310 on the outer circumferential surface of the upper link.

A plurality of bars 342 and 343 may be rotatably provided between the connector 340 and the lower link 310, such the upper link 320 and the lower link 310 are folded or unfolded.

To be more specific, as shown in the drawing, a coupling unit 341 with two coupling positions provided in the upper and lower portion thereof may be provided on the outer circumferential surface of the connector 340. At the lower coupling position of the two coupling positions, the lower link 310 may be directly connected, and at the upper coupling position, the lower link 310 may be connected via the plurality of bars 342 and 343 rotatably provided between the connector 340 and the lower link 310. A location of the connector 340 of the lower link 310 directly connected to the lower coupling position and a location connected to the upper coupling position via the plurality of bars 342 and 343 may be formed differently.

In the embodiment, the connector 340 and the lower link 310 may be coupled to each other while forming a four-bar link structure constituted by the coupling unit 341, the plurality of bars 342 and 343 of the connector 340, and the lower link 310.

The compact mobility device may further include an encoder 500 provided between the upper link 320 and the connector 340, wherein the encoder 500 measures a rotation angle between the upper link 320 and the connector 340. The rotation angle between the upper link 320 and the connector 340 measured by the encoder 500 can be the basis for controlling the speed difference between the plurality of drive wheels 200.

Figure 7:
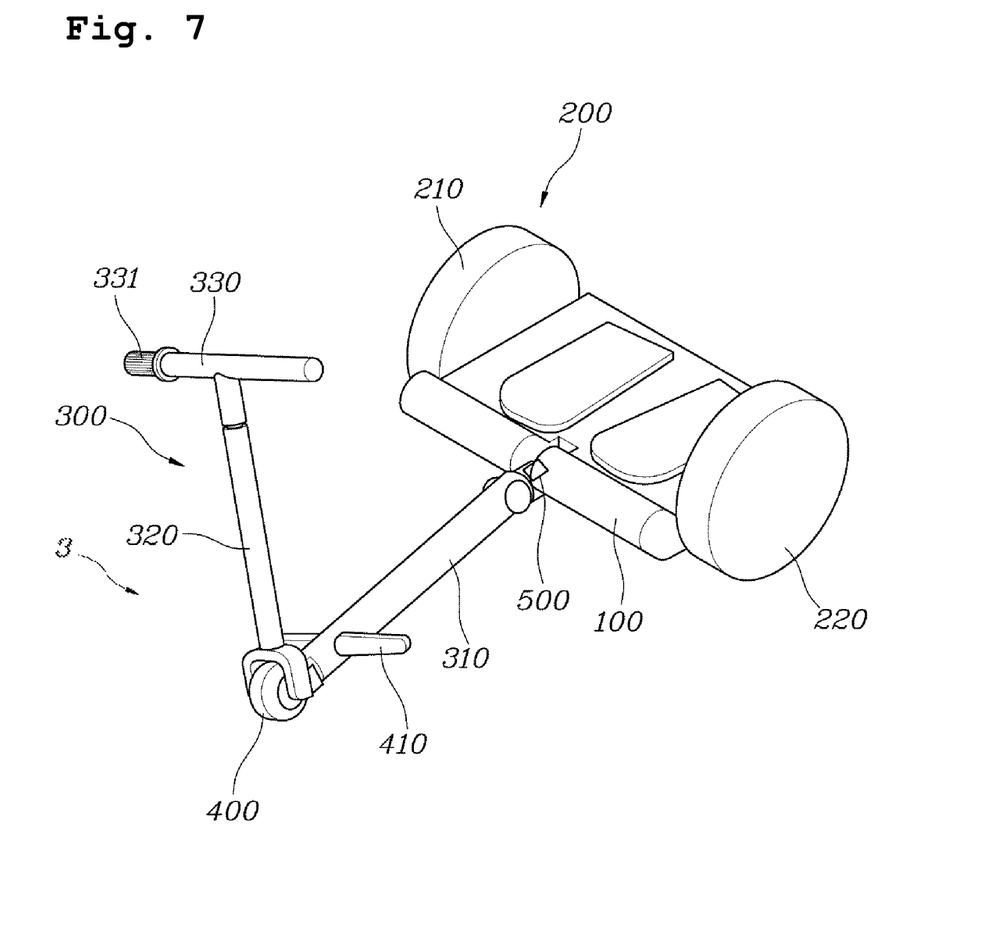
FIG. 7 is a perspective view showing the compact mobility device having steering mechanism 3 according to an embodiment of the present invention.

FIG. 7 is a perspective view showing the compact mobility device having steering mechanism 3 according to an embodiment of the present invention.

Referring to FIG. 7, the auxiliary wheel 400 of the steering mechanism 3 is generally constituted by one rotating wheel, and the rotating wheel is rotatably coupled to the link. The auxiliary wheel 400 may be coupled to the upper link 320 through a fork, or the like.

The lower link 310 may be rollably coupled to the base panel 100. The lower link 310, the upper link 320, and the auxiliary wheel 400 may be connected to each other to be rolled together as the steering handle 330 is rolled, whereby the lower link 310 can be rolled based on the base panel 100 as the steering handle 330 is rolled.

The steering handle 330 is provided with the speed controller 331 that receives a desired speed of the plurality of drive wheels 200 from the operator.

The compact mobility device may further include an encoder 500 provided between the lower link 310 and the base panel 100, wherein the encoder 500 measures a rolling angle between the lower link 310 and the base panel 100. The rolling angle between the lower link 310 and the base panel 100 measured by the encoder 500 can be the basis for controlling the speed difference between the plurality of drive wheels 200.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A compact mobility device having an adjustable drive mode, the compact mobility device comprising:
    a base panel;
    a plurality of drive wheels rotatably provided at opposite ends of the base panel, the drive wheels configured to rotate by receiving torque from a driving unit;
    a column constituted by a plurality of links connected in series to be foldable, the column configured such that a lower end of a lower link is rotatably coupled to the base panel, and an upper end of an upper link is provided with a steering handle; and
    an auxiliary wheel provided between the plurality of links constituting the column, the auxiliary wheel configured to roll along with the drive wheels by coming into contact with a ground when the plurality of links is folded.

2. The compact mobility device of claim 1, wherein the column is configured to be bent forward from a lower to an upper end thereof in an unfolded state.

3. The compact mobility device of claim 1, wherein the steering handle is rotatably coupled to the upper link.

4. The compact mobility device of claim 3, further comprising an encoder between the steering handle and the upper link, the encoder configured to measure a steering angle of the steering handle based on the upper link.

5. The compact mobility device of claim 1, wherein the steering handle is provided with a speed controller that is configured to receive a desired speed of the drive wheels from an operator.

6. The compact mobility device of claim 1, wherein the base panel is provided with a back plate, the back plate being configured to be rotated based on the base panel, so as to constitute a footrest by being accommodated in the base panel, or so as to constitute a backrest by being opened from the base panel.

7. The compact mobility device of claim 1, further comprising a foot plate provided at a location near the auxiliary wheel, the foot plate being configured to be rotated based on the lower link and to be accommodated in or opened from the lower link, thereby constituting a footrest.

8. The compact mobility device of claim 1, wherein the compact mobility device is configured to go straight when the plurality of drive wheels is at a same speed, and to corner when a speed difference occurs between the plurality of drive wheels.

9. The compact mobility device of claim 1, wherein
    the auxiliary wheel is an omni-directional wheel constituted by a plurality of rotating wheels relatively rotatable with each other;
    an installation direction of the auxiliary wheel is fixed in a straight direction; and
    steering is achieved by each of the rotating wheels having a relative wheel speed when cornering by a speed difference between the plurality of drive wheels.

10. The compact mobility device of claim 9, wherein the steering handle is rotatably coupled to the upper link.

11. The compact mobility device of claim 10, further comprising an encoder between the steering handle and the upper link, the encoder configured to measure a steering angle of the steering handle based on the upper link.

12. The compact mobility device of claim 1, further comprising:
    a connector being in a shape that surrounds an outer circumferential surface of the upper link, the connector being rotatably coupled to the upper link;
    wherein the auxiliary wheel and the upper link are rotated together as the steering handle is rotated; and
    wherein an outer circumferential surface of the connector is coupled to the lower link.

13. The compact mobility device of claim 12, further comprising a plurality of bars rotatably provided between the connector and the lower link, such that the upper link and the lower link are folded or unfolded.

14. The compact mobility device of claim 13, wherein the connector and the lower link are coupled to each other in a four-bar link structure.

15. The compact mobility device of claim 12, further comprising an encoder provided between the upper link and the connector, wherein the encoder is configured to measure a rotation angle between the upper link and the connector.

16. The compact mobility device of claim 1, wherein
    the lower link is coupled to the base panel so that a rolling between the lower link and the base panel is possible; and
    the lower link, the upper link, and the auxiliary wheel are rolled together as the steering handle is rolled.

17. The compact mobility device of claim 16, further comprising an encoder provided between the lower link and the base panel, wherein the encoder is configured to measure a rolling angle between the lower link and the base panel.

18. A compact mobility device having an adjustable drive mode, the compact mobility device comprising:
    a base panel;
    a driving unit;
    a plurality of drive wheels rotatably provided at opposite ends of the base panel, the drive wheels configured to rotate by receiving torque from the driving unit;
    a column constituted by a plurality of links connected in series to be foldable, the column configured such that a lower end of a lower link is rotatably coupled to the base panel, and an upper end of an upper link is provided with a steering handle; and
    an omni-directional wheel provided between the plurality of links constituting the column, the omni-directional wheel constituted by a plurality of rotating wheels relatively rotatable with each other so that steering can be achieved by each of the rotating wheels having a relative wheel speed when cornering by a speed difference between the plurality of drive wheels.

19. The compact mobility device of claim 18, further comprising a connector surrounding an outer circumferential surface of the upper link, the connector being rotatably coupled to the upper link, wherein the omni-directional wheel and the upper link are rotated together as the steering handle is rotated, and wherein an outer circumferential surface of the connector is coupled to the lower link.

20. A compact mobility device having an adjustable drive mode, the compact mobility device comprising:
- a base panel;
- a first wheel attached to a first end of the base panel;
- a second wheel attached to a second end of the base panel, the second end being opposite the first end;
- a lower link extending away from the base panel, a first end of the lower link being rotatably coupled to an edge of the base panel;
- an upper link having a first end foldably coupled to a second end of the lower link;
- a steering handle coupled to a second end of the upper link; and
- an auxiliary wheel located between the second end of the lower link and the first end of the upper link;
- wherein the compact mobility device is configured to operate in a first mode as a two-wheel device using the first wheel and second wheel; and
- wherein the compact mobility device is configured to operate in a second mode as a three-wheel device using the first wheel, the second wheel and the auxiliary wheel.

\* \* \* \* \*